Aug. 28, 1962  H. DA COSTA  3,051,026
MICROMANIPULATOR
Filed Feb. 19, 1959  7 Sheets-Sheet 1

INVENTOR.
Harry da Costa
BY Mueller & Aichele
Attys.

Aug. 28, 1962 H. DA COSTA 3,051,026
MICROMANIPULATOR
Filed Feb. 19, 1959 7 Sheets-Sheet 5

INVENTOR.
Harry da Costa,
BY Mueller & Aichele
Atty's.

Aug. 28, 1962 H. DA COSTA 3,051,026
MICROMANIPULATOR
Filed Feb. 19, 1959 7 Sheets-Sheet 6

Aug. 28, 1962  H. DA COSTA  3,051,026
MICROMANIPULATOR
Filed Feb. 19, 1959  7 Sheets-Sheet 7

INVENTOR.
Harry da Costa,
BY Mueller · Aichele
Att'ys.

United States Patent Office 3,051,026
Patented Aug. 28, 1962

3,051,026
MICROMANIPULATOR
Harry da Costa, Phoenix, Ariz., assignor to Motorola,
Inc., Chicago, Ill., a corporation of Illinois
Filed Feb. 19, 1959, Ser. No. 794,391
20 Claims. (Cl. 78—82)

This invention relates to apparatus and methods for moving miniature and micro-miniature pieces into a certain relation for the assembly of those pieces into a given device on a mass production basis, or for testing or otherwise acting upon such pieces. More specifically, the invention is particularly adapted for the handling of pieces and subassemblies of sizes just referred to in the assembly of products such as high frequency transistors.

In considering the use of this invention in the assembly of a high frequency transistor, the following relative dimensions provide an idea of the problems involved in producing such a device. The completed transistor body has about the same volume as the eraser on an ordinary lead pencil. The entire active transistor area would fit onto the end of a human hair, and certain gold wire leads in the transistor are as small in diameter as one-seventh the diameter of the average human hair.

These wire leads must be connected to electrodes on the semiconductor body of the transistor and also to leads or posts which are used in making external connections to the transistor. It has been found that thermocompression bonding of these wires is an effective technique of making contact to the electrodes or "stripes" of the transistor being manufactured according to the present invention. However, one can readily visualize the difficulty of placing a .4 mil (.004″) gold wire on top of a stripe 1 mil wide and 2 mils long and contacting the wire directly above the stripe with a bonding point that is only about two square mils in area. This is what is required to make the bond.

It has been found that prior art apparatus and methods which might be considered applicable to the operation just described are deficient in several important respects. For instance, known manipulating apparatus is not capable of accurately positioning and bonding these parts as required with sufficient speed to provide a desirable output rate. Even if considerable time is taken and diligence is exercised, units bonded with prior art apparatus are sufficiently non-uniform in structure and performance as to keep yields undesirably low. Furthermore, the operator must be highly skilled, and the demands are such that he or she becomes unduly fatigued in less than a normal working period which, of course, reduces the speed of operation and the uniformity of the work. The combined effect of these deficiencies is that it would be extremely difficult to produce these tiny high frequency transistors in mass production quantities of high quality at a commercially acceptable cost.

An object of the present invention is to provide a method and apparatus capable of accurately positioning micro-miniature parts and subassemblies in a desired relation, and of performing a precise operation thereon on a mass production basis.

Another object is to provide apparatus as described in the preceding paragraph for bonding micro-miniature contact wires in the assembly of high frequency transistor devices, and which will consistently produce the bond at exactly the required place so that desirable uniformity in structure and operation of the transistor unit is obtained.

Still another object of the invention is to provide a micro-manipulator and bonding machine for use in the production of high frequency transistors, having several hand operated levers and mechanisms controlled by an operator to bring various components into the desired position for bonding, wherein all movements by the operator and all visual observations to be made are of a character to minimize the fatigue factor for the operator.

A feature of the invention is the provision of a micromanipulator and bonding machine with a microscope for viewing the tiny parts being handled, and with pantograph controls for moving the parts only very small distances upon actuation by normal hand movements, with the magnification of the microscope and the reduction of the pantograph controls being matched so that the movements observed by the operator through the microscope correspond both in direction and magnitude with the movements the operator senses when operating the controls, thereby facilitating operation of the machine and minimizing the fatigue factor.

Another feature of the invention is the provision of a control mechanism for accurately positioning with respect to a reference point a carrier body which is movable in a given plane, the control mechanism including a pair of coaxial spindles rotatable independently by respective arms of a pantograph lever system, with the spindles having cam surfaces thereon which convert the rotary movements of the spindles into planar movements of the carrier body corresponding with planar movements of the pantograph actuating lever.

Another feature is the provision of a micro-manipulator and bonding machine for connecting tiny contact wires to certain electrodes and leads of high frequency transistor devices, and having high speed handling and feeding systems for both the contact wires and the subassemblies to which they are to be bonded such that the time required to position the parts and make the bonds is minimized and high output rates are obtained.

A further feature of the invention is the provision of micro-manipulator apparatus having a tool for performing a precise operation on a workpiece of micro-miniature size and a microscope mounted at its base for movement in three directions and provided with a target finder such as cross-hairs, with manually operated levers for aligning the tool and the microscope relative to the workpiece so that the tool will engage the same at the exact point on which the cross-hairs are sighted. This can be done quickly and accurately and provides highly uniform results and high yields in the ultimate product.

Still nother feature is the provision of a micro-manipulator and bonding machine as described above with a binocular microscope having cross-hairs in one tube, the microscope being tilted at a predetermined angle to prevent apparent variation in the lateral position of the cross-hairs with respect to the workpiece upon changing the focus of the microscope. Thus, the bonding tool may be preset to make the bond at the point sighted with the cross-hairs, and this preset relationship is fixed and independent of the focus of the microscope.

The invention is illustarted in the accompanying drawing in which.

The ultimate function of the process and apparatus of the present invention is to bond very fine contact wires to electrodes on a semiconductor wafer and to corresponding leads mounted on a header. This bonding operation is one step in the assembly of these and other parts to provide a high frequency transistor. Because of the minute size of all of the parts being handled and the necessity for great accuracy in positioning the parts for the bonding operation, several levers, plates and control mechanisms are provided in the machine, and the operator actuates these by hand movements to bring the parts into position for bonding. The final movements of the parts must be very small in order to locate them accurately, and the control mechanisms include pantograph lever systems and cams which reduce the large scale hand movements to provide the desired small movements of the parts. The operator observes the positions and movements of the parts through a binocular microscope, and the magnification of this microscope is matched with the reduction of the control mechanisms so that a hand movement which feels like one inch in a given direction will appear to cause a component to move one inch in the same direction. This makes it possible for the operator to spend long periods of time looking through the microscope and operating the machine without undue fatigue. Accuracy of movement is obtained by the provision of special cams cooperating with machine parts which are spring loaded to eliminate backlash.

Accuracy in locating the exact point where the bond will be made is achieved by pre-adjusting the bonding point so that when it is in the bonding position it lines up exactly with cross-hairs in the microscope. This relationship between the bonding point and the cross-hairs is fixed, so if the cross-hairs are lined up properly the bonds will be made at the correct place on each unit.

The header units are fed successively to the bonding position on a movable carriage which in one embodiment comprises the links of a loop-chain. This is provided with a stop mechanism for accurately locating each link when it reaches the bonding area, and also a pawl mechanism for rotating the header through 90° after the first contact wire has been bonded, thereby positioning the header for bonding a second contact wire. The contact wires are short wire segments secured on a support in comb-like fashion. One wire support at a time is positioned on a movable plate which provides the final small controlled movement for positioning each wire over the electrode and lead, and an indexing mechanism moves that wire support relative to the plate to bring successive wires into bonding position.

All of this mechanism can be broken down into three main sections, namely, that for handling the headers, that for handling the contact wires, and that for handling the bonding point and microscope. A full description of each of these subjects will be given, but first the machine as a whole will be considered to point out the overall relationships and to identify the various movements and the levers, positioning plates, and control associated therewith.

Figures 1, 2, 2A:
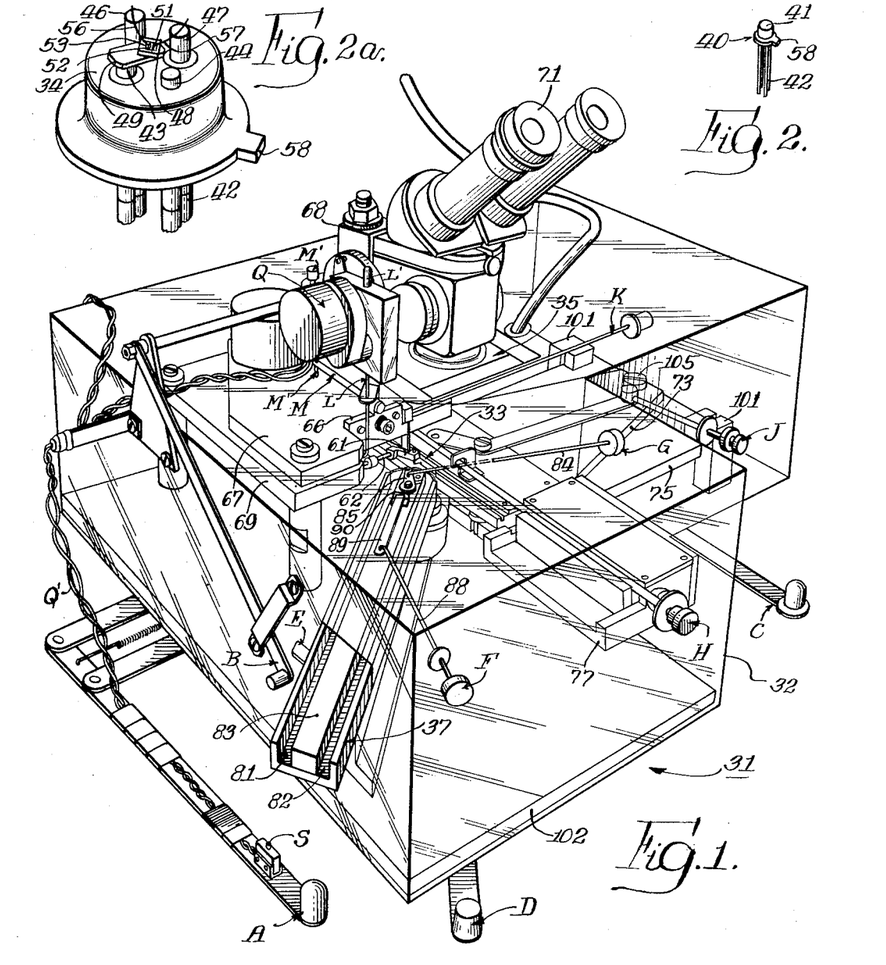
FIG. 1 is a perspective view of a micro-manipulator bonding machine in accordance with the invention.
FIG. 2 shows in actual size a high frequency transistor unit which is the end product of the manufacturing operation in which the machine of FIG. 1 is used.
FIG. 2a is a view of the header assembly of the high frequency transistor unit of FIG. 2 enlarged eight times over actual size.

FIG. 1 is a perspective view of the bonding machine 31 and shows all of the levers, rods and the like (designated A through M inclusive) which are manually controlled by the operator to bring the header, contact wire, and bonding point into position and to make the bonds. The bonding machine 31 is partially housed by a transparent case 32 which provides a reasonably closed chamber in which a slightly reducing atmosphere is maintained to in turn provide extreme cleanliness of the wire and other parts. The formation of oxides on the wires would interfere with the bonding, so the reducing atmosphere is provided to prevent this. The reducing atmosphere consists of nitrogen with 5% hydrogen which provides a very dry, humidity-free condition. The case 32 keeps out dust and dirt which also would interfere with bonding. The fact that the bonding machine 31 is susceptible to enclosure for maintaining a dry, clean atmosphere is one of its important aspects.

Figure 3:
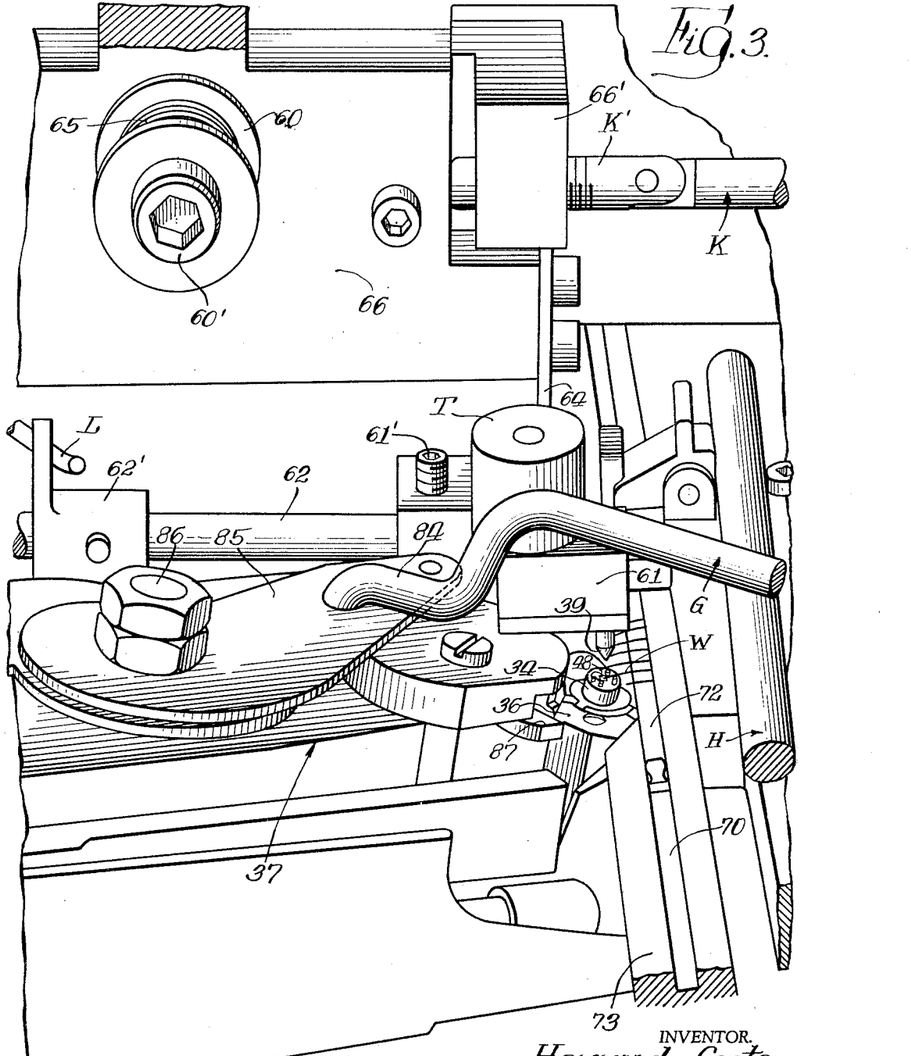
FIG. 3 is a close-up view of the "heart" of the micromanipulator bonding machine of FIG. 1 showing the relative positions of the header subassembly, the contact wire, and the bonding point at the time a bond is made.

The bonding actually takes place in the area designated generally as 33 in FIG. 1, and shown in detail in the central right hand area in FIG. 3. The operator views this area through the microscope 71. The greatly enlarged view of the bonding area in FIG. 3 brings out the small size and intimate association of the elements which are brought together. In FIG. 3, a transistor header 34 supported in the link 36 at the operating end of the track unit 37 is at the bonding position. The track unit 37 is stationary, and a stop member 87 engages the link 36 and holds it stationary until the bonding operation is completed and the stop is released. Thus, the header units are brought to a fixed location, and the other elements involved in the bonding are moved with respect to the header in order to line them up. These other elements are a piece of wire indicated generically by the letter W, but more specifically later by 38, and the bonding point 39. As shown in FIG. 3 (and FIG. 18) one end of a wire W contacts the semiconductor wafer 48 on the header 34, and the bonding point 39 is lined up over the wire and is brought down on it to make the bond.

FIG. 2 shows a complete high frequency transistor unit of the "mesa" type which is the end product of the assembly in which the machine of FIG. 1 is used. The transistor unit 40 is shown in actual size in FIG. 2 and measures .673 inch from the top of the can or cover 41 to the end of the external leads 42 and has a diameter at the flange portion of the body of .200 inch. The header part of the transistor without the can or cover is shown in FIG. 2a and is enlarged eight times in comparison to FIG. 2. The external leads 42 extend through the header 34 and form four posts which are identified by reference characters 43, 44, 46 and 47, for easier reference in the remaining description of this specification. The four posts may be considered as being located at the corners of a square with the semiconductor wafer 48 being located at the center of the square.

Figure 2B:
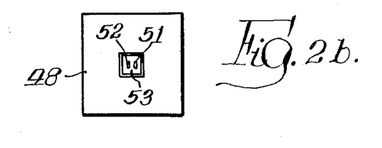
FIG. 2b is a view of a semiconductor die unit included in the transistor of FIGS. 2 and 2a enlarged many times to show the tiny electrodes or stripes provided on an isolated central portion of the die which is the active area of the transistor.
Figure 19:
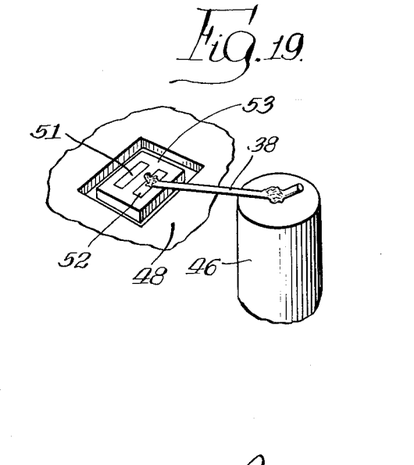
FIG. 19 is a view of fragmentary portions of the semiconductor unit and a post on the header enlarged many times, and showing the result of the operation illustrated in FIG. 18 with the contact wire bonded to an electrode and to said post or lead wire.

The semiconductor die 48 (FIG. 2b) is mounted (FIG. 2a) on a molybdenum heat sink tab 49 which in turn is attached to the collector lead 43. Lead 44 is in physical and electrical connection with the metallic body of header 34 and that lead together with the portions of the header body which extend between the electrodes provide a shielding effect which reduces inter-electrode capacitance, and of most importance, reduces feedback capacitance. The semi conductor die 48 has two tiny electrodes or stripes 51 and 52 on an isolated central portion 53 of the unit which is the active area of the transistor, as can be seen best in FIGS. 2b and 19. The central portion 53 is approximately 3.5 mils square, the electrodes 51 and 52 are each one mil wide and two mils long, and they are spaced .5 mil apart. Electrode 51 is made of evaporated and alloyed aluminum and provides the emitter of the transistor. Electrode 52 is made of evaporated and alloyed gold and silver and makes an ohmic connection to the base layer of the transistor.

Referring again to FIG. 2a, the two tiny wires 56 and 57 make contact respectively from the post 46 to the base electrode 52 and from the post 47 to the emitter electrode 51, and are successively bonded to the respective elements during the bonding operation. These contact wires 56 and 57 are made of gold and are only .4 mils (.0004 inch) in diameter which means they are practically invisible, so it is readily apparent that they are extremely delicate and difficult to handle. Of course it has been necessary to exaggerate the size of the wires in the drawings in order to show them at all. The contact wires 56 and 57 form a 90° angle between them, so it is possible to minimize the movements of the bonding point and the wire by rotating the header 90° after the first wire has been bonded, thereby easily bringing the other electrode and lead into position for bonding. The rotation is accomplished by engaging the tab 58 with a rotating mechanism to be described later.

Figures 5, 9:
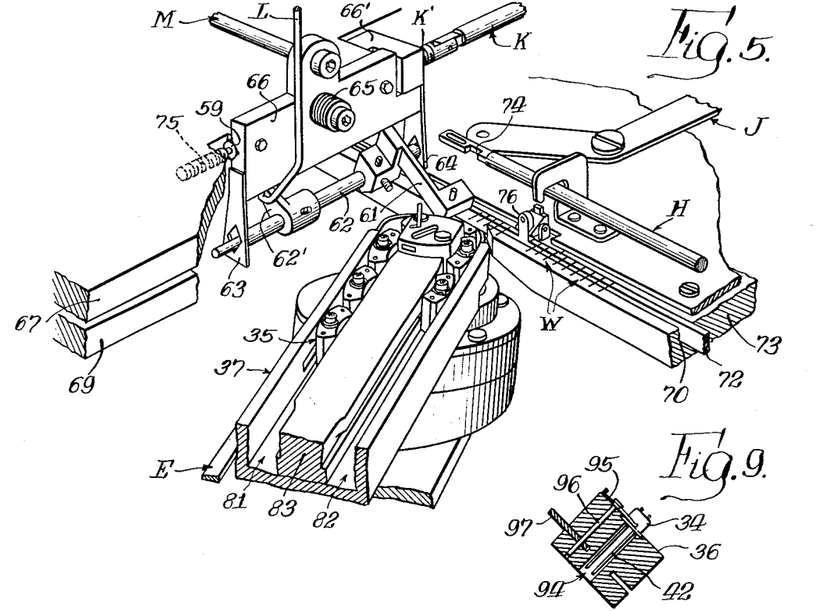
FIG. 5 is a perspective view with certain parts omitted and which illustrates the relation between the header, wire, and bonding point sections of the machine as detailed in FIGS. 3 and 4.
FIG. 9 is a sectional view, taken along line 9—9 of FIG. 7, of one of the chain links with a header subassembly therein, and showing particularly a spring-clip holding the header in position on the link.

Referring now to FIGS. 1, 3, 5 and 10 in particular, the various rods and levers which are moved by the operator to bring the bonding point and the wire into position over the header will be described. After this description, the controls and their respective functions will be listed in a table for ready reference. As may be seen best in FIGS. 3 and 5, the bonding point 39 is part of a hammer assembly 61 which pivots on a rotatable rod 62 extending between two depending legs 63 and 64 on a base 66. The base 66 couples the hammer assembly 61 to a positioning or mounting plate 67. The base 66 is pivotally movable around an axis represented by a rod K and is also adjustable along this axis. Viewing the mechanism as in FIGS. 1, 3 and 5, the hammer assembly may be adjusted to the left and right with respect to plate 67 by operating the rod K which in turn operates an adjusting screw K'. A holder 66' secured to the plate 67 has a threaded hole which receives the adjusting screw K' so that this screw moves longitudinally as it is rotated. A spring plunger 75 (FIG. 5) on the left side of the base 66 biases it to the right against the adjusting screw K', so the base 66 follows the longitudinal movement of the screw K'. Two locating rollers 59 (one is shown in FIG. 5) are fastened to the base 66 and fit into opposed V-shaped grooves in plate 67 and base 66. The screw K' engages one of these rollers and the plunger 75 engages the other. The rollers 59 slide along the groove in plate 67 during left and right adjustment, and rotate in this groove during pivotal adjustment. The base 66 has an enlarged hole behind the washer 60 (FIG. 3) which permits the left and right movement just desribed, and yet the base is held tightly against the plate 67 by the heavy spring 65 intermediate the head of the screw 60' and the washer 60.

The bonding point may also require adjustment forward or backward, and this is accomplished by raising or lowering screw M' (FIG. 1) which in turn tips the rod M securely fastened to the base 66 at its top (FIG. 5). The base pivots on the rollers 59 as previously described, and this in turn tips the legs 63 and 64 supporting the hammer point shaft 62 providing movement of the bonding point forward or backward in an arcuate path.

Figures 10, 11, 12, 13, 13A:
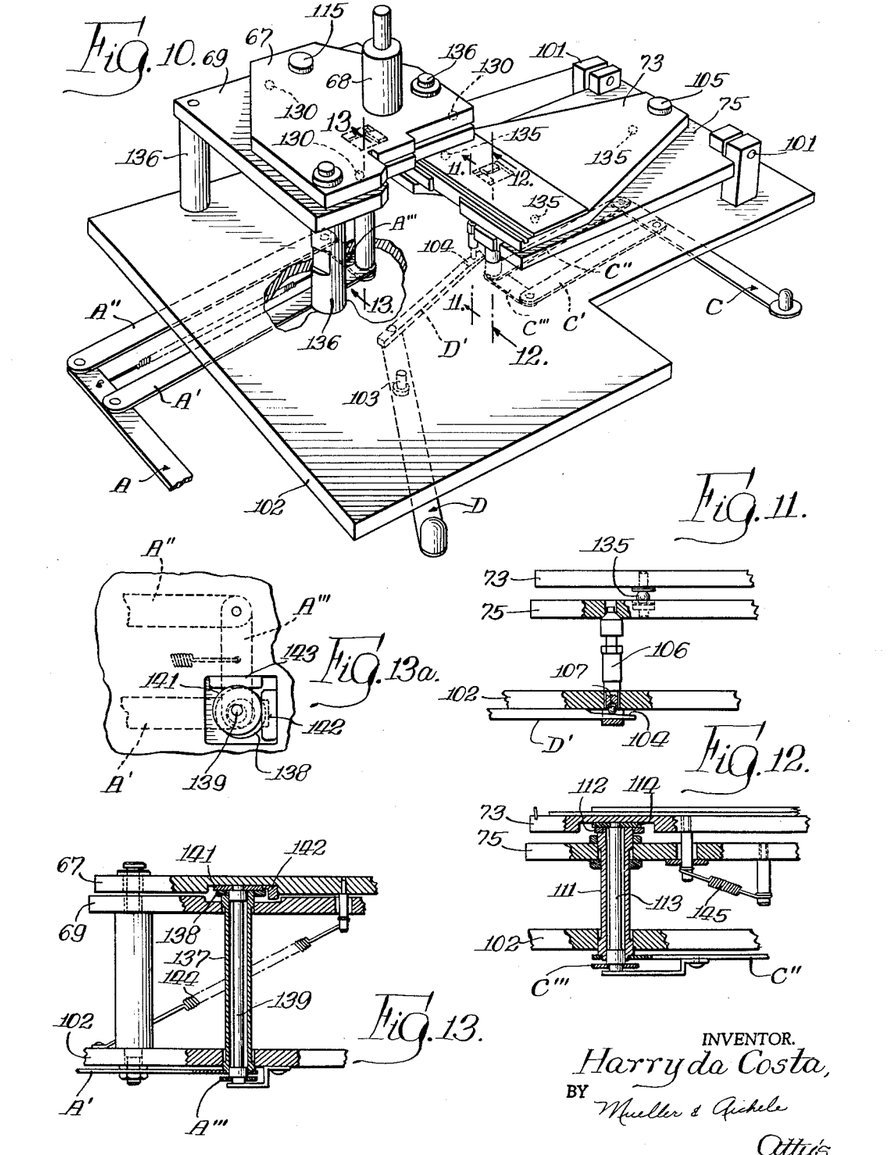
FIG. 10 is a perspective view of just the plates and levers which move the microscope-bonding point assembly and the contact wires into position for bonding.
FIG. 11 is a sectional view, taken along line 11—11 of FIG. 10, of the lever and cam arrangement for controlling vertical movement of the wire positioning assembly.
FIG. 12 is a sectional view, taken along line 12—12 of FIG. 10, of the lever and cam arrangement for controlling horizontal movement of the wire positioning assembly.
FIG. 13 is a sectional view taken along the line 13—13 of FIG. 10, of the lever and cam arrangement for horizontally moving the microscope-bonding point positioning assembly.
FIG. 13a is a top view of the structure of FIG. 13.

The plate 67 also carries the binocular microscope 71 (see FIG. 1) on a mounting post 68 extending from the plate (see also FIG. 10). Through the microscope, the operator can clearly see the slight movements of the contact wire and therefore can accurately control its movement so as to position it on the appropriate electrode and lead as illustrated in FIG. 3. The microscope has cross-hairs in the left lens as viewed in FIGS. 1 and 21 which are moved into alignment with the spot on the contact wire where the bond is to be made, and the bonding point is adjusted and set with respect to the microscope by adjusting rod K and rod M, as, previously described, so that the bonding point will always come down on the contact wire at the exact spot indicated by the cross-hairs.

A test procedure may be employed in presetting the bonding point in alignment with the cross-hairs. In carrying this out, the bonding point is lowered on a dummy or test body which simulates the header and wire, and the point makes a mark on the body which is observed through the microscope. If the mark is offset from the cross-hairs, the hammer and bonding point assembly is moved left or right by operating control K—K' and forward or backward by operating the control M—M'. The test is repeated until the mark made by dropping the hammer is aligned with the cross-hairs. After this preset relation is obtained, all that the operator need do to be sure the bonding point engages the wire at the right spot is move the cross-hairs into alignment with that spot.

A rod L is connected to a crank 62' on the rod 62 which supports the hammer 61. Upward movement of rod L rotates rod 62 in a direction to pivot the hammer and bonding point downwardly, and, of course, downward movement of rod L pivots the hammer and bonding point upwardly. Rod L is normally operated by a synchronous motor Q which is controlled by switch S connected by leads Q' to the motor circuit. The motor rotates a cam which engages a transverse pin through rod L (not shown). The hammer is raised by rotation of the cam, and its downward movement by gravity is controlled by the cam. The normal force applied through the point 39 for bonding is approximately 3,000 pounds per square inch. However, this varies with the particular point being used, and testing for such proper force is done by changing the weight T on the hammer (FIG. 3) until the proper weight and speed of movement is found. The position of the hammer 61 on the rod 62 may be adjusted by loosening the set screw 61' (FIG. 3) to free the hammer and then tightening this screw after the hammer is moved either pivotally or axially along rod 62 to the desired position. In this way, the upper position of the point 39 may be set. If desired, the pin L' connected to rod L constitutes an alternate mechanism for manually raising the pivoted point structure after which it is permitted to drop by gravity, as compared to the motor driven operation by means of the synchronous motor Q.

A lever system A is manually controlled by the operator to move the bonding point and microscope mounting plate 67 horizontally with respect to the support plate 69 which is stationary. This will be described more in detail later with particular reference to FIGS. 10 to 13 inclusive. The microscope and bonding point mounting plate 67 rides on three roller bearings 130 provided between it and the base plate 69. Lever system B (FIG. 1) is manually operated to in turn move the microscope itself vertically with respect to the positioning or mounting plate 67, thus providing an adjustment for quickly focusing the microscope. This is accomplished while maintaining a reasonably gas tight chamber for the bonding point and wire by means of a flexible covering 35 indicated in FIG. 1.

Figure 4:
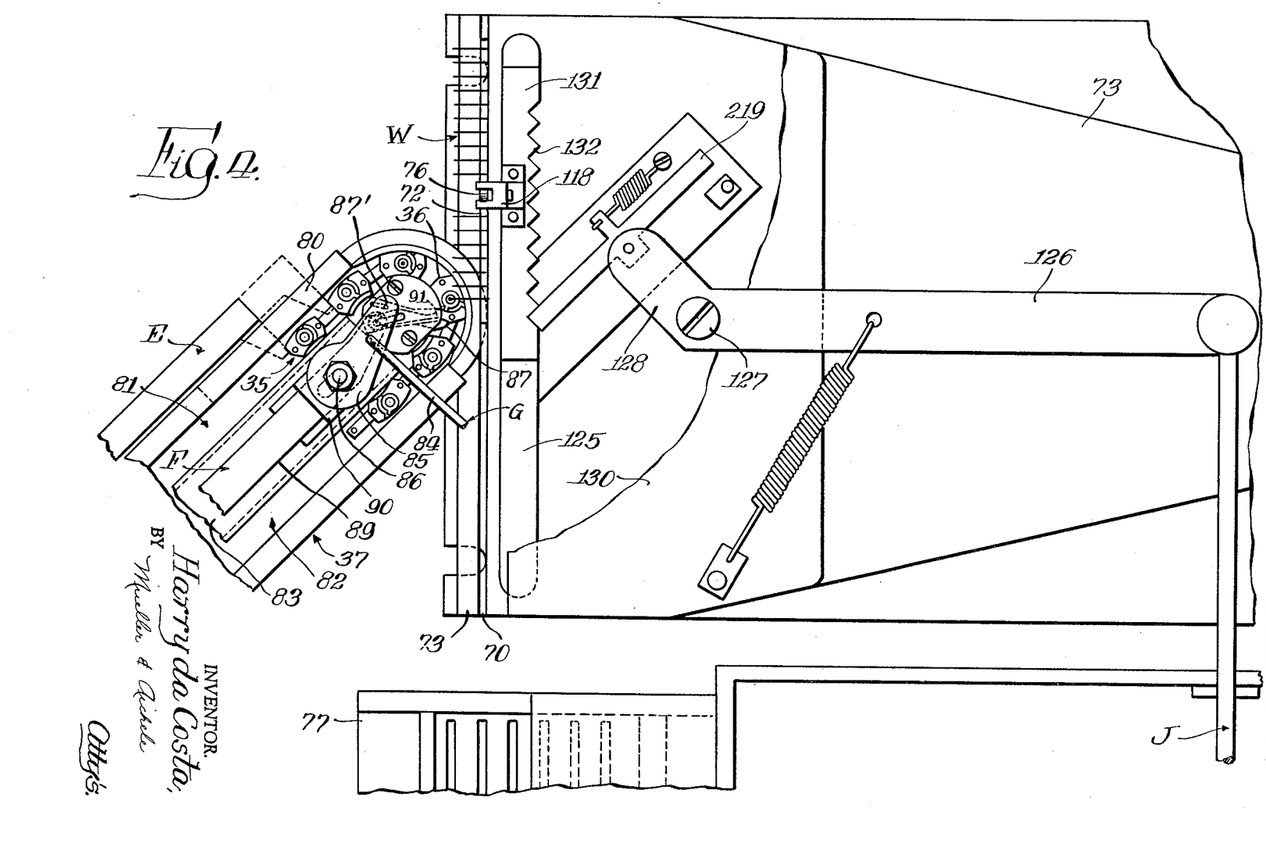
FIG. 4 is a plan view of the portion of the apparatus where the headers and contact wires are brought together for bonding.

Referring again to FIG. 3, the contact wires W are provided in a comb-like arrangement on a holder or support 72 which is carried by another movable positioning or mounting plate 73 (see also FIGS. 4 and 10). The holder 72 fits into a channel 70 in the plate 73. The one of the wires W which is approximately located at the bonding area is moved into exact position over the electrode or lead of the header by movement of the positioning plate 73.

As may be seen in FIGS. 1 and 10, the lever system C is moved manually by the operator to move the plate 73 and the wires carried on it in two horizontal directions. Specifically, when the lever system C is pulled toward the operator, who would be sitting in front of the machine as viewed in FIGS. 1 and 10, the left end of plate 73 is likewise pulled forward around a pivot point 105 at its right end. Pushing the lever system C away from the operator provides the opposite movement for the plate 73. Lever system D provides vertical movement of the plate 73 through a cam action which will be described. Lever J is pushed in to provide the step-by-step indexing of the wires W. Each time lever J is pushed in, the wire holder 72 is moved just enough to bring the next wire segment into approximate position for bonding. Levers C and D are then operated as required to move this wire segment into exact position over an electrode and the lead to which the wire will be bonded. The cross-hairs of the microscope 71 are lined up on the wire directly over the electrode by controlling levers A and B as previously explained. Switch S is operated to bring the bonding point down onto the wire applying very high pressure to the wire and making the bond according to well-known thermo-compression bonding techniques.

Next, the cross-hairs are aligned with the point on the wire directly over the connecting lead by operating levers A and B, which also moves the bonding point 34, and the switch S is again operated to make the second bond.

Now the transistor header is rotated through 90° to bring the other electrode and lead into position for bonding. This rotation of the transistor header is accomplished by manual movement of the lever system F on the track unit indicated generally by 37. When lever F is pushed in its moves a pawl 91 which engages the tab 53 on the header (see FIGS. 6 and 7) and rotates the header 90°. A contact wire is bonded to the newly positioned electrode and lead in the manner previously described.

The next header subassembly is then moved into the bonding area by pushing the slide lever E (FIGS. 1 and 6) inward to move the chain 35 in the track unit 37. Simultaneously, rod G is pushed in to put the stop member 87 in the path of the link moving up to the bonding area, and when this link engages the stop it is properly located for the bonding operation.

This completes the cycle for one transistor header and covers all of the controlled movements or operations involved in one cycle. The chain is filled with a header in each link as shown in FIGS. 3–7 and 9, and successive headers are moved into place by step-by-step or indexed movement of the chain feed mechanism. The finished transistors are removed from the side of the chain moving away from the bonding area.

When the wire segments W on the wire holder 72 have been used up, this unit is removed and another substituted in its place by manipulating rod H. Rod H (FIGS. 1, 5, 14 and 16) has a cutout 74 at the inner end thereof, which engages with a projection 76 on the holder 72 in order to slide the latter out of the channel in plate 73. The storage tray 77 is pushed in slightly by means of handle N (FIGS. 14 and 15) to align a fresh holder with the channel 70 in plate 73, and rod H is then manipulated to slide this holder into the channel.

Figures 14, 16:
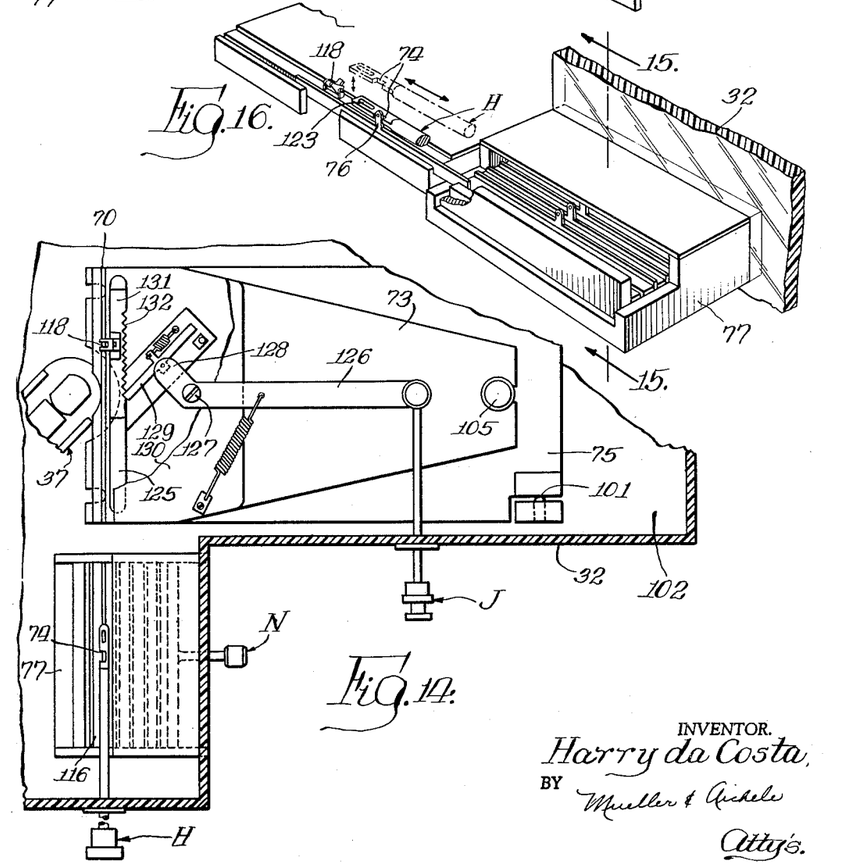
FIG. 14 is a plan view of the mechanism for feeding and indexing the wire combs which provide the contact wires used in the bonding operation.
FIG. 16 shows how the combs are slid into place on the positioning assembly therefor.

The following table may be referred to for quick identification of the various lever systems and rods and their respective control functions or movements. FIGS. 1, 10 and 14 are the best illustrations of these elements.

TABLE I

Lever A—Horizontal movement in any horizontal direction of microscope and bonding point positioning plate.
Lever B—Vertical movement of microscope for quick focusing.
Lever C—Horizontal movement in any horizontal direction of wire positioning plate.
Lever D—Vertical pivoted movement of wire positioning plate.
Lever E—Movement of chain in track.
Lever F—Rotation of header within chain link.
Lever G—Operates chain stop mechanism for locating the header at the bonding area.
Rod H—For sliding wire holders from storage into position for use in bonding, and for removing exhausted wire holders.
Lever J—Indexing of wire holders to move wire segments into approximate bonding position.
Rods K—K'—Sidewise adjustment of bonding point for alignment with cross-hairs.
Rods M—M'—Forward and backward adjustment of bonding point for alignment with cross-hairs.
Switch S—Motor control for operation of bonding point.
Pin L'—Manual control for operating bonding point.
Handle N—Adjustment of wire holder storage tray.

The handling of the headers, of the contact wires, and of the microscope and bonding point mechanism will be taken up more specifically in the following sections of the specification.

Handling of the Headers

FIGS. 4 to 9 illustrate the various mechanisms which are used in feeding and positioning the headers. The chain 35 slides around the loop-shaped track 37. (Only part of the chain 35 is illustrated.) The chain rides in channels 81 and 82 on opposite sides of the center section 83 of the track. The chain is advanced to bring a header into position for bonding by operating the slide lever E, and in FIGS. 4 and 6 two positions are shown. The lever system indicated by the letter G is used for moving a stop 87 for the chain in and out of position, and consists of an operating arm 84 connected to a linking arm 85 which is pivotal about pin 86. One end of linking arm 85 is connected by pin 87' (FIGS. 4 and 7) to a stop member 87 which is slidable in a passage in the center section of the track, and whose end is movable in and out of the channel in which the links are moved. In the extended position of the stop member 87 it will engage the end of the approaching chain link 36 and hold it in the proper position. The stop member is withdrawn by pushing lever G in. Lever E has a projection 80 which engages the end of the link aligned therewith, and the chain 35 may be moved by pushing lever E inwardly from the solid line position to the dotted line position illustrated in FIGS. 4 and 6. After the link 36 has cleared the stop member 87, lever G is pulled out so as to stop the next successive link in the header bonding position.

Figures 6, 7, 8:
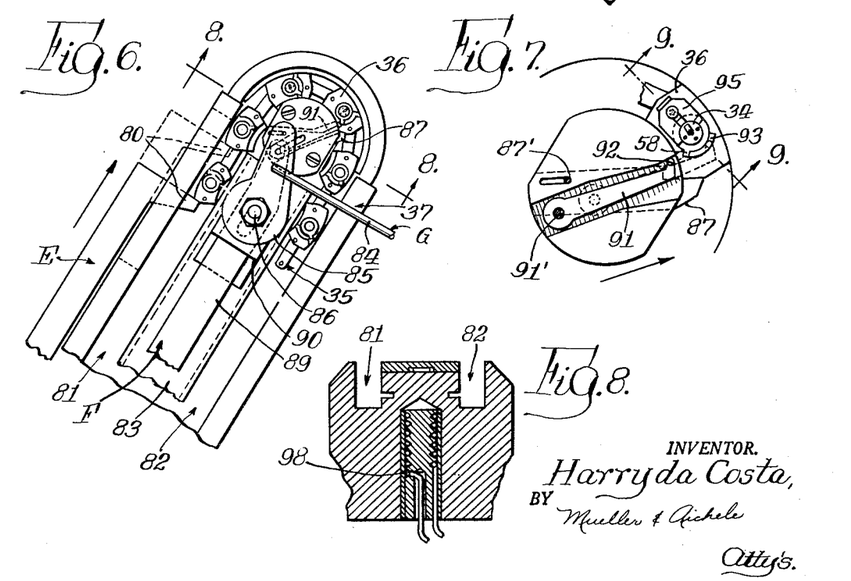
FIG. 6 is a plan view of part of the chain mechanism which carries the header subassemblies and which is operable to move them successively into position for bonding.
FIG. 7 is a detail view of part of the mechanism of FIG. 6 and shows a stop mechanism which locates the header for bonding one contact wire and a pawl mechanism which rotates the header into position for bonding another contact wire.
FIG. 8 is a sectional view, taken along line 8—8 of FIG. 6, showing in particular the heater which establishes the header units at the proper temperature for bonding.

After one contact wire is bonded in place, the transistor header is rotated 90° by pushing in on the lever system designated generally as F, as previously mentioned. The lever system F consists of an actuating arm 88 (FIG. 1) and a slidable arm 89 which is movable longitudinally of the center section of the track and which extends under the strap 90. The inner end of the slidable arm 89 is connected by pin 91' to a pawl 91 (see FIG. 7) which is slidable in a channel in the center section of the track and located over stop member 87. The tip 92 of the pawl is engageable with the tab 58 on the flange portion of the header body. The two positions of the pawl 91 are shown in FIG. 7, and they illustrate how the header body 34 is rotated in the link 36. The tab 58 fits into an arcuate groove 93 which is just long enough so that when the tab has moved from one end of the groove to the other, the transistor body 34 has been rotated 90°.

FIG. 9 is a sectional view of one of the links 36 and shows how the header unit 34 fits into it. The connecting leads 42 for the transistor extend down through a central opening 94 in the link, and the flange portion of the header fits on top of the link. A U-shaped spring clip 95 (note FIG. 7 as well) fits down over the header flange with its legs on either side of the header body and holds the header firmly against the link 36. The holding action of the spring clip 95 insures good heat conduction to the header and also insures that the tab 58 will not slip out of its groove when the header is rotated. Each link 36 is detachable merely by removing the bolts 96, thereby releasing the link from the connecting member 97. Thus, the chain 35 may be increased or decreased to any desired length very readily.

As can be understood from the preceding description, the chain can be of any convenient length relative to the track 37 (FIG. 1), and can be loaded and then inserted in the track at the front link of the chain and moved through a cycle, or each link can be loaded and unloaded at the beginning and end of the track, as desired. In either case, it is moved link by link, or step by step through the track by the levers E and G.

FIG. 8 shows the heating coil 98 which is positioned in the conveyor or track adjacent the end thereof where the bonding takes place, and is provided to heat the header units to the proper temperature. It should be understood that this heat is not the energy which makes the bond, for the bond itself is made by applying a very finely concentrated force through the bonding point to a contact wire W so that pressure at the bonding location is extremely high. The heat supplied by heating coil 98, however, establishes the proper ambient temperature in the bonding area for the header and bonded elements.

*Wire Handling*

The mechanism for handling and positioning the wire holders and hence each successive piece of wire, will be described with reference to FIGS. 4, 10–12, and 14–17. In FIG. 10, several of the portions of the micro-manipulator bonding machine are omitted in order to give a clear picture of the positioning plates 67 and 73 which respectively carry the bonding point into position while positioning the microscope, and move a wire W into bonding position. Plate 73 for moving the wires is movable in two horizontal directions, and is also movable vertically on plate 75. Inasmuch as both the horizontal and vertical movements are pivotal, there is an arcuate configuration to the paths of movement although they are essentially sidewise, forward and backward, and up and down. Horizontal movement is controlled by lever system C and vertical movement by lever system D as previously mentioned. Positioning plate 73 rests on three ball bearings 135 provided between it and the supporting plate 75. Plate 75 is pivotally mounted on two posts 101 in such a way as to permit vertical movement of such supporting plate, and consequently plate 73 as well. The vertical movement lever D is pivotally connected to the base plate 102 by the pivot pin 103. The inner end of lever D is pivotally connected to a slide arm D' which has a tapered end 104 (see FIG. 11). A vertical post 106 has its upper end engaging the supporting plate 75 while its lower end rests on a ball bearing 107 carried in a cavity at the end of the post, and engaging the tapered surface 104. The ball 107 rolls up and down the tapered camming surface 104 and converts the motion of such surface into vertical movement of the post 106, and this in turn moves plates 75 and 73 vertically.

The horizontal movement of the plate 73 on the bearings 135 is about the pivot pin 105, and is accomplished by lever C which is pivotally connected to two parallel pantograph arms C' and C'' at one end thereof. Another arm C''' is pivotally connected to the other end of arm C'. Plate 73 has a U-shaped opening through which pin 105 extends to permit radial movement of the plate as well as pivotal movement. As seen in FIG. 12, arm C'' is connected to the tubular sleeve 111 which rotates cam 112 to provide backward and forward movement of the plate 73, as viewed in FIG. 10. Arm C''' is connected to the center post 113 which rotates cam 114, and provides left and right movement of the plate. Thus, the cams are on coaxial spindles which are independently rotatable by the associated pantograph arms. The cams and spindles convert the planar movement of the pantograph lever C into corresponding planar movement of the wire positioning plate 73 so as to move the wires on the holder with respect to the header. Rotation of cams 112 and 114 moves the plate 73 a very small distance in comparison with the movement of lever C, and this reduction makes it possible to position the wire W carried on plate 73 very precisely.

FIGS. 4 and 14 show the mechanism for feeding and indexing the wire holders on the positioning plate 73 so as to get a wire into position for bonding. The wire holders are inserted and withdrawn from the longitudinal channel 70 in the positioning plate by operation of the rod H (FIG. 14). Rod H is pulled out to the lower position shown in FIG. 14 in order to engage the cutout portion 74 with the projection 76 on the holder (see also FIG. 16). The holder is aligned with the channel 70 by moving the storage tray 116 on its support 77 using the handle N which extends through the opening 117' in the wall of the transparent casing or housing 32. When the holder is aligned, rod H is pushed in to slide it into channel 70 as illustrated in FIG. 16. A pivoted locking blocks 118 (FIGS. 4, 16 and 17) couples the holder 72 to the indexing mechanism controlled by lever J. This locking block has two projections 121 and 122 (FIG. 17) which fit around the projection 76 on the holder to hold it in place. The block 118 is pivotally mounted on posts 119 so that it can be swung back to free the comb for withdrawal when it is exhausted. The slot 123 in the end of the rod H fits over the lug 123' and rod H is used to swing the locking block 118 out of the way and free the holder (see FIG. 16).

Figures 15, 17, 17A:
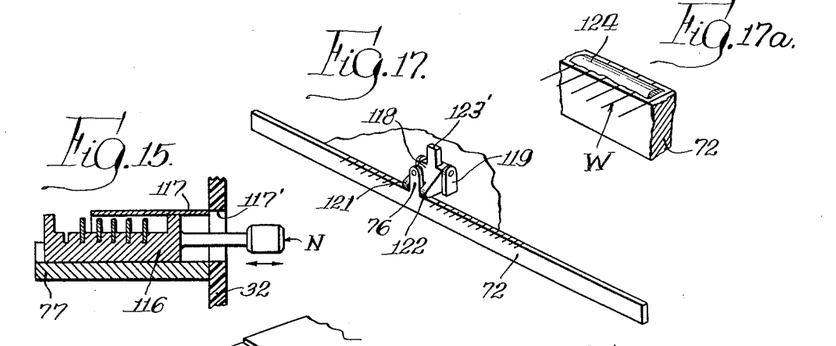
FIG. 15 is a sectional view of the storage chamber for the wire combs.
FIG. 17 shows a comb and the mechanism for locking it in place on the carrying assembly.
FIG. 17a is an enlarged fragmentary view of the comb of FIG. 17 showing the arrangement of the wire segments in comb-like fashion.

The wires themselves are attached to the top of the holder 72 and extend therefrom in spaced parallel relation just like the teeth of a comb, as illustrated in FIG.

17a. The wire segments W are secured by a layer 124 of soluble adhesive such as a material sold under the trademark "Glyptol." After all wire pieces on a comb have been used up, the adhesive is dissolved and the holder or support member 72 for the wires is cleaned and prepared to receive a new set of wires.

Successive wires are indexed into position by pushing in on rod J (see FIGS. 4 and 14). Rod J is pivotally connected to a bent member 126 which pivots about pin 127. The end 128 of member 126 moves diagonally in response to "in and out" movement of rod J. Underneath the portion of the cover plate 130, which is partially cut away in FIGS. 4 and 14, there is a pawl 129 which is connected through the cover to the diagonally movable end 128 and which engages the teeth 132 of a ratchet member 131. The locking block 118 described previously is secured to this ratchet member 131 and transmits its movement along the slot 125 to the comb or support 72. Rod J is pushed in and pawl 129 pushes ratchet member 131 to move holder 72 in channel 70 toward the front of the machine just enough to set up the next successive wire W on the comb for bonding.

*Movement of Microscope and Bonding Point*

This subject will be described with reference to FIGS. 3, 10, 13, 13a and 18–21. Referring first to FIG. 10, the microscope and bonding point positioning plate 67 is movable horizontally around a pivot pin 115, and is carried on the stationary supporting plate 69. Plate 67 has a U-shaped opening through which pin 115 extends to permit radial movement of the plate as well as pivotal movement. A three point ball bearing support 130 is provided between the two plates 67 and 69 to give this freedom of movement. This ball bearing support system 130 for the movable plate 67 is the same as the ball bearing system 135 provided for the comb mounting plate 73. Each ball is supported in a small cavity in the lower plates 69 and 75 (see FIG. 11).

The support plate 69 is attached to three posts 136 extending up from the base plate 102. Horizontal movement of positioning plate 67 is accomplished by the lever A which acts through the pantograph arms A′, A″ and A‴. In FIG. 13 it may be seen that the arm A′ is connected to a vertical sleeve 137, and a cam 138 is attached to the upper end of that sleeve. Thus, forward and backward movement of lever A will be transmitted through pantograph arm A′ to the sleeve 137 which will rotate cam 138 and cause forward and backward movement of plate 67. Pantograph arm A‴ is connected to a vertical post 139 inside sleeve 137, and another cam 141 is connected to the top of this post. Thus, arms A″ and A‴ transmit sidewise movement of lever A to spindle or post 139, and the post rotates cam 141 to move the plate 67 sidewise. The combined effect of the two spindles 137 and 139 with their cams 138 and 141 is to move plate 67 in the same direction that lever A is moved, so the operator will observe a diagonal movement, for instance, if he moves lever A diagonally. The movement of the plate is small because of the reduction provided by the pantograph and cam arrangement, and this provides accuracy of control as previously explained.

FIG. 13a considered with both FIGS. 11 and 12 show the operation of the cams for the wire positioning plate 73, and the operation of those for the microscope and bonding plate 67. Because of spring tension on the plates and levers, backlash is substantially eliminated, and the cam and cam follower structure substantially reduces the wear on parts being moved relative to one another. The cam system for each said plate is substantially the same, and that for plate 67 will be described.

The cams 138 and 141 as viewed in FIG. 13a engage respectively two blocks 142 and 143 which are 90° apart relative to the center of the cams. These blocks are mounted in the plate 67 and are urged against the cams 138 and 141 by a spring 144 (see FIG. 13) which runs diagonally from the base plate 102 to the mounting plate 67. Another spring 145 biases plate 73 (FIG. 12) in the same manner. Cam 138 has a shape providing forward and backward radial movement of plate 67, and cam 141 has a shape providing left and right pivotal movement of the plate. The blocks 142 and 143 are made of a very hard material, and the cams 138 and 141 are made of a relatively soft material. Therefore, any dust, grit or other foreign object which might generate friction and damage the cams and blocks will actually be absorbed in the surface of the soft cams and will not harm the cooperation of the cams and the blocks. It may be noted that the lever system has a predetermined relation with cams 138 and 141 such that a hand movement to the right, for example, will move arm A‴ rotating cam 141 to move the plate 67 to the left. The reason for this reverse relationship is that movement of the microscope to the left will make it appear to the operator that the transistor body is moving to the right corresponding with the hand movement to the right. As previously mentioned, the construction of the cams 112 and 114 and the associated parts for moving the wire positioning plate 73 horizontally is substantially the same. However, the relation of the lever system C to cams 112 and 114 is such that movement of the plate 73 corresponds directly with the hand movements of the operator, and therefore a hand movement to the right will appear to the operator looking through the microscope as a movement of the wire to the right, just as it actually is.

Figure 18:
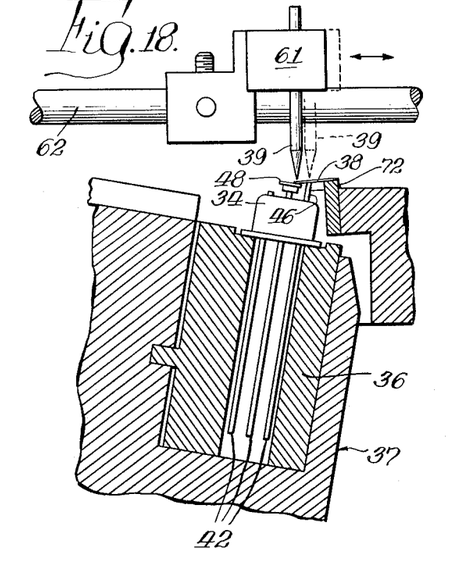
FIG. 18 is an enlarged view showing a contact wire positioned over a transistor electrode and the associated lead with the bonding point engaging the contact wire in changed positions corresponding to the two places at which it makes the bonds.

FIGS. 18–21 illustrate the functioning of the bonding point and its relationship to the microscope. In FIG. 18, the wire 38 is located over the semiconductor wafer 48 and one of the connecting leads or posts 46, before bonding and prior to severing the bonded portion from the end piece which is left on the wire comb or support 72. The two changed positions of the bonding point 39 required for bonding the wire to both the electrode on the wafer and to the connecting lead are shown. The wire is severed merely by moving the support 72 thereby tensioning the wire, and since the bond is stronger than the wire, the tension causes the end of the wire to break off, leaving the bonded portion intact. The result of the bonding operation is shown greatly enlarged in FIG. 19 where the wire portion 38 has one end bonded to the electrode 52 and the other end bonded to the connecting lead or post 46.

Figure 20:
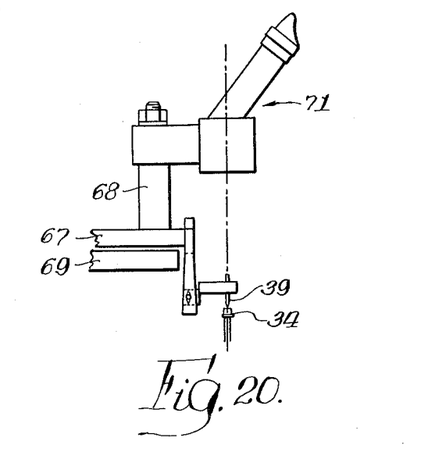
FIG. 20 is a side view of the microscope and bonding point assembly used in the machine of FIG. 1.
Figure 21:
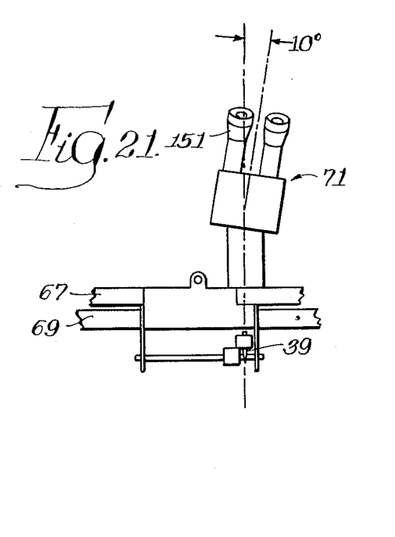
FIG. 21 is a front view of the microscope and bonding point assembly showing the microscope in the tilted position which permits the focus on the microscope to change without any apparent change in the lateral position of cross-hairs relative to the workpiece.

The alignment of the microscope and bonding point is illustrated in FIGS. 20 and 21. The bonding point 39 is preset so that when it is brought down it will be on the center line of the microscope as viewed from the side as in FIG. 20. However, viewed from the front as in FIG. 21, the bonding point 39 when brought down into bonding position moves in a plane which is parallel with and includes the optical axis of the object field of the lens system 151 which is associated with the cross-hairs. The bonding point is mounted to move vertically, and the microscope is tilted to the side by an angle of 10°. The 10° tilt is just enough that the optical axis of the object field of the lens system in the tube 151 is vertical, and therefore, vertical movement of the microscope for focussing purposes will produce no apparent lateral movement of the cross-hairs.

From the foregoing description it is apparent that the micro-manipulator and bonding machine of the present invention makes it possible to control the movements of the components and tools involved in bonding very accurately and with considerable speed. At the same time, the machine is composed of relatively simple parts such as plates, levers and cams, so the cost of the machine itself is not exhorbitant. Both the header feeding mechanism and the wire feeding mechanism are designed so as to maximize the rate at which bonded units are turned out. All movements by the operator and all visual observations to be made are such as to minimize the fatigue factor for the operator.

I claim:
1. Micromanipulator apparatus for use in performing a precise operation on a workpiece of miniature size, said apparatus including in combination, a base, a support plate mounted on said base, a positioning plate on said support plate, bearing means between said plates permitting movement of said positioning plate in the plane thereof means connected to said positioning plate having first and second cam surfaces disposed angularly with respect to each other, first and second coaxial and independently rotatable cams engaging said first and second cam surfaces respectivley and each having a shape to cause movements of said positioning plate in the aforesaid plane upon rotation of said cams, means biasing said positioning plate and urging said cam surfaces against said cams, and control means coupled to said cams to rotate the same, said control means and said cams providing reduction of control movements so that the resulting movements of said positioning plate will be substantially smaller than the control movements.

2. Micromanipulator apparatus for use with a microscope in performing a precise operation involving at least one object which is sufficiently small as to require that it be viewed with the microscope while performing such operation, said apparatus including in combination, a base, a support plate mounted on said base, a positioning plate on said support plate and movable thereon for moving an object with respect to a work area which can be viewed with the microscope, means connected to said positioning plate having first and second cam surfaces disposed angularly with respect to each other, first and second coaxial and independently rotatable cams engaging said first and second cam surfaces respectively and each having a shape to cause planar movements of said positioning plate upon rotation of said cams means biasing said positioning plate and urging said cam surfaces against said cams, and a pantograph lever system including an actuating portion, said lever system being operatively connected to said cams to rotate the same and having a predetermined relation with said cams such that movement of said actuating portion in a given direction causes movement of said plate in a corresponding direction, said lever system and said cams providing reduction of the movements of said actuating portion to produce smaller movements of said positioning plate, with such reduction being matched to the magnification of the microscope, so that movement of an object by said positioning plate with respect to another object viewed through the microscope appears to correspond in distance and direction with the movements of said actuating portion.

3. Micromanipulator apparatus for use in performing a precise operation on a workpiece of miniature size, said apparatus including in combination, a base, a mounting structure on said base including pivot means, a support plate connected to said pivot means for pivotal movement in generally vertical directions, a pivot member on said support plate, a positioning plate on said support plate connected to said pivot member for pivotal and radial movement with respect thereto in generally horizontal directions, bearing means between said plates supporting said positioning plate and permitting horizontal movement of said positioning plate, said positioning plate having first and second cam follower surfaces disposed in substantially right angle relation with respect to each other, a first spindle having a rotary cam portion engageable with said first cam surface to cause small radial movements of said positioning plate with respect to said pivot member, a second spindle coaxial with said first spindle and having a rotary cam portion engageable with said second cam surface to cause small pivotal movements of said positioning plate about said pivot member, a spring biasing said positioning plate and urging said cam surfaces against said cam portions, a pantograph lever system coupled to said spindles for rotating the same, said pantograph lever system and said spindles providing reduction of control movements to the desired small horizontal movements of said positioning plate, means including cam follower means connected to said support plate, and another lever system including an arm having a tapered cam surface engaging said cam follower means, said arm of said other lever system being movable horizontally to move said cam follower means vertically thereby pivoting said support plate about said pivot means and moving said positioning plate in a generally vertical direction, said other lever system providing reduction of control movements to the desired small vertical movements of said positioning plate.

4. Micromanipulator apparatus for use with a microscope having a target finder therein in performing a precise operation on a workpiece of miniature size at a work area wherein the microscope can be employed to view the workpiece while the operation is performed thereon, said apparatus including in combination, a movable positioning structure having the microscope operatively connected thereto and movable by said positioning structure, means for supporting the workpiece in the viewing field of the microscope, control means operatively connected to said positioning structure for moving the same thereby permitting viewing of the workpiece through the microscope and permitting controlled movement of the microscope to align the target finder therein with selected places on the workpiece, a tool associated with said positioning structure for movement therewith and separately movable with respect thereto in a controlled path to a specific work position at which it can perform work on the workpiece, said tool being adjustable to establish the same in a predetermined relation with the microscope so that upon operation of said control means said tool will be aligned with the workpiece at precisely the place with which the target finder is aligned.

5. Micromanipulator apparatus for use with a microscope having cross-hairs therein in performing a precise operation on a workpiece of miniature size, said apparatus including in combination, a base, a support plate mounted on said base, a positioning plate on said support plate, bearing means between said plates providing movement of said positioning plate with respect to said support plate, mounting means on said positioning plate for receiving and holding the microscope thereon, means for locating the workpiece in the viewing field of the microscope, cam follower means connected to said positioning plate, rotatable cam means engaging said cam follower means and having a shape to cause small movements of said positioning plate in the plane thereof, a pantograph lever system coupled to said cam means to rotate the same, a tool, coupling means attaching said tool to said positioning plate for movement therewith and providing further movement of said tool in a controlled path to engage the workpiece, and adjustment means cooperating with said coupling means and operable to preset said tool in a predetermined aligned relation with the microscope so that said tool is engageable with the workpiece as a place with which said cross-hairs are aligned as viewed through the microscope, whereby said tool can be positioned accurately by operation of said lever system to engage a selected place on the workpiece.

6. Apparatus for use in the production of semiconductor devices, which in complete condition include elements that are too small to be assembled effectively by direct hand manipulation, said apparatus including in combination, a base, a frame on said base, carrying means moveable along said frame and having regularly spaced portions for carrying a number of the incomplete semiconductor devices, means operable to move said carrying means incrementally to bring the semiconductor devices successively to a predetermined work position, a support plate mounted on said base, a positioning plate on said support plate for positioning an object to engage a selected place on the device located at said predetermined position, bearing means between said plates permitting movement of said positioning plate in the plane thereof, and control means coupled to said positioning plate and operable to move said positioning plate small distances with control movements over greater distances to provide accurate positioning of the aforesaid object with respect to the work position.

7. Micromanipulator apparatus for use in attaching contact wires to miniature electronic devices, said apparatus including in combination, a base, a support plate mounted on said base and moveable vertically, a positioning plate on said support plate, bearing means between said plates providing horizontal movement of said positioning plate with respect to said support plate, an elongated holder member having a plurality of wires secured thereto and extending therefrom in spaced relation, said positioning plate having an elongated channel for receiving said holder member, a movable structure on said positioning plate for moving said holder member along said channel, indexing means cooperating with said movable means and having a manual control element operable to move said structure and bring said wires successively to a predetermined position, means for locating an electronic device adjacent said predetermined position for said wires, and control means coupled to said plates for moving the same small distances.

8. Assembly and manipulating apparatus for use in attaching minute wires to an electronic device which is in incomplete condition at the time of the assembly operation, said apparatus including in combination, a base, a support structure mounted on said base and movable vertically, a positioning member movable horizontally on said support structure, a wire feeding mechanism operatively connected to said positioning member for supplying wire to a predetermined position relative to said positioning member and movable by said positioning member to assemble such wire to an electronic device, means for locating an electronic device adjacent said predetermined position for said wire, and first and second control means respectively coupled to said support structure and said positioning member for moving the same small distances with control movements over greater distances to accurately position such wire while assembling it.

9. Appartus for use with a microscope and adapted to be controlled by an operator to bond contact wires to semiconductor devices, said apparatus including in combination, a base, first and second support plates mounted in separate places on said base, said second support plate being movable vertically, first and second positioning plates on said first and second support plates respectively, respective bearing means between said positioning plates and said support plates permitting horizontal movement of said positioning plates in the respective planes thereof, first and second lever systems respectively coupled to said first and second positioning plates for moving the same horizontally, a third lever system coupled to said second support plate for moving the same vertically, a frame on said base, a movable carriage for said frame having regularly spaced portions for carrying a number of the semiconductor devices to a work area, first control means operable to move said carriage, mounting means on said first positioning plate for receiving and holding the microscope in a position permitting viewing of the work area, a bonding tool, coupling means attaching said bonding tool to said first positioning plate for movement therewith and providing further movement of said tool in a controlled path to engage a semiconductor device upon locating the same at said work area, a wire feeding mechanism operatively connected to said second positioning plate for movement therewith and having second control means for operating said wire feeding mechanism to supply wire to a predetermined position relative to said second positioning plate, whereby the operation of said first control means supplies a semiconductor device for bonding and the operation of said second control means supplies a wire for bonding, with said second and third lever systems being operable to align said wire with a selected place on the semiconductor device and with said first lever system being operable to position said bonding tool to engage said wire with said selected place on the device to bond said wire thereto.

10. Apparatus for use with a microscope and controlled by an operator to bond contact wires to semiconductor devices of miniature size, said apparatus including in combination, a base, first and second support plates mounted in separate places on said base, said second support plate being movable vertically, first and second positioning plates on said first and second support plates respectively, bearing means between said positioning plates and said support plates permitting movement of said positioning plates in the respective planes thereof, said positioning plates each having cam surfaces thereon, first and second rotatable means respectively engaging said cam surfaces of said first and second positioning plates and each having a shape to cause small movements of said positioning plates in the aforesaid planes thereof upon rotation, first and second pantograph lever systems coupled respectively to said first and second cam means to rotate the same, a third lever system coupled to said second support plate for moving the same vertically, said lever systems and said cam means providing reduction of control movements to the desired small movements of said positoning plates, a frame on said base, a movable carriage on said frame having regularly spaced portions for carrying a number of the semiconductor devices in succession to a work area to move the same, mounting means on said first positioning plate for receiving and holding the microscope in a position permitting viewing of the work area, a bonding tool, coupling means attaching said bonding tool to said first positioning plate for movement therewith and providing further movement of said tool in a controlled path with respect to said work area, a holder having a plurality of wires thereon arranged in spaced relation, a movable structure on said second positioning plate for receiving said member and providing movement thereof with respect to said second positioning plate, second control means coupled to said movable structure for moving the same to bring said wires successively to the work area, whereby operation of said first control means supplies a semiconductor device for bonding and operation of said second control means supplies a wire for bonding, with said second and third lever systems being operable to align such wire with a selected place on a semiconductor device and with said first lever system being operable to position said bonding tool to engage such wire with said selected place on the device for bonding the same thereto.

11. Apparatus for use in performing a precise work operation on a workpiece of miniature size, said apparatus including in combination, a horizontal base plate for supporting operating portions of the apparatus at a vertical height providing easy access for manual actuation by an operator, a positioning plate spaced above said base plate and adapted to be coupled to an object to be positioned with respect to a work area, means supporting said positioning plate in a generally horizontal position including bearing means on which said positioning plate rides, said bearing means permitting movement of said positioning plate in generally horizontal directions, rotary cam means coupled to said positioning plate constructed to cause small movements of said positioning plate upon rotation of said cam means and providing micrometric graduation in different positions in which said positioning plate can be established, and control means coupled to said cam means for rotating said cam means, said control means having an actuating portion located within vertical limits defined by said base plate and said positioning plate so as to be readily accessible for manual actuation.

12. Apparatus for use in performing a precise work operation on a workpiece of miniature size, said apparatus including in combination, plate-like positioning means adapted to move an object so as to position said object with respect to a work area, means supporting said positioning means for movement in generally horizontal directions, rotary cam means operatively connected to said positioning means and constructed to cause small movements of said positioning means upon rotation of said cam means and providing micrometric graduation between different positions in which said positioning means can be established, and control means operatively connected to said cam means for rotating said cam means, said control means having an actuating portion movable in a substantially horizontal plane, said cam means and said control means constituting a parallel motion mechanism which causes said positioning means to reflect movements of said actuating portion and provides reduction of the movements of said actuating portion to much smaller movements of said positioning means.

13. Apparatus for use in positioning an object precisely with respect to a work area, said apparatus including in combination, a supporting structure, a movable positioner structure, on said supporting structure and movable thereon in generally horizontal directions, means carrying said supporting structure and permitting movement thereof with said positioner structure in generally vertical directions, a first lever system having a first actuating portion movable in generally horizontal directions, rotary cam means operatively connected to said first lever system and to said positioner structure for moving said positioner structure horizontally upon actuation of said actuating portion of said first lever system, said first lever system and said cam means providing reduction of movements of said first actuating portion to much smaller corresponding movements of said positioner structure, a second lever system having a second actuating portion movable in a reference plane and having a wedge cam portion movable horizontally, cam follower means engaging said wedge cam and movable vertically thereby upon actuation of said second actuating portion, and means connecting said cam follower means to said supporting structure for moving the same and said positioner structure vertically, said wedge cam and said second lever system providing reduction of movements of said second actuating portion to much smaller corresponding movements of said positioner structure.

14. Apparatus for use with a microscope having a target finder in performing a precise operation on a workpiece of miniature size, said apparatus including in combination, a supporting structure, a movable positioner structure on said supporting structure mounting means on said positioner structure for receiving and holding the microscope in a position to permit viewing of a work area, control means operatively connected to said positioner structure for moving the same over a limited range of movement, a tool associated with said positioner structure for movement therewith, means providing further movement of said tool in a controlled path with respect to the work area, and means for establishing said tool in a predetermined relation with the microscope as mounted on said mounting means so that said tool is movable along said path to a specific position relative to a target in the work area, which latter position can be established by operation of said control means to bring the target finder of the microscope as mounted into alignment with the target as viewed through said microscope.

15. Apparatus for use in attaching contact wires to assemblies which in complete form are electronic devices, said apparatus including in combination, means for supporting such an assembly at a work area, a tool for bonding a contact wire to a selected portion of such an assembly, first micromanipulator means operatively connected to said tool for accurately positioning the same with respect to the work area, a wire feeding structure having a plurality of contact wires extending therefrom in spaced relation, second micromanipulator means operatively connected to said wire feeding structure for providing accurate positioning of said wire feeding structure and a contact wire thereof with respect to the work area, and means cooperating with said wire feeding structure providing incremental movement of said wire feeding structure with respect to the work area so as to supply said contact wires thereof to said work area in succession.

16. Apparatus for use in attaching contact wires to subassemblies for electronic devices, said apparatus including in combination, means forming a track extending to a work area, an elongated conveyor structure movable along said track and having a plurality of mounting portions spaced regularly along the length thereof for receiving a plurality of the aforesaid subassemblies and for supplying such subassemblies to the work area in succession, a wire feeding structure for supplying contact wire to the work area, a tool for bonding a contact wire to such a subassembly, first micromanipulator means operatively connected to said wire feeding structure for accurately positioning said wire feeding structure and a wire thereof with respect to the work area, and second micromanipulator means operatively connected to said tool for accurately positioning said tool with respect to the work area.

17. Manipulating apparatus adapted for use in positioning an object with respect to another object at a work area associated with said apparatus, with at least one of the objects being so small as to require viewing of the work area with a microscope while the positioning operation is accomplished, said manipulating apparatus including in combination positioner means supported for movement in a first plane and adapted to move an object to be positioned, operating means in the apparatus having an actuating portion movable in a second plane that is substantially parallel to and is separated from said first plane in which said positioner means moves, and means operatively connecting said operating means to said positioner means including rotary cam means which translates planar movements of said actuating portion into corresponding planar movement of said positioner means and reduces the said movements of said actuating portion to substantially smaller movements of said positioner means.

18. Apparatus for use in establishing two objects precisely in predetermined positions relative to one another so that an operation requiring such precision positioning of the objects can be performed on at least one of the objects, with at least one of the two objects being so small as to require that it be viewed with a microscope while the operation is performed, said apparatus including in combination first micromanipulator means having a microscope therewith and movable by said first micromanipulator means, which said microscope affords a magnified view of a work area in the apparatus and has a target finder adapted to provide an aiming function in placing one of said two objects in the work area, second micromanipulator means adapted to position the other of said two objects at a selected place in said work area, and means with said first micromanipulator means establishing said one object in a predetermined relationship with said target finder of said microscope so that said one object can be moved to a specific position relative to said other object by operation of said first micromanipulator means so as to bring the target finder of the microscope into alignment with at least a portion of said other object in the work area.

19. Apparatus for use with a microscope having a target finder therein in performing an operation on at least one object at a work area in the apparatus, with the target finder being adapted to serve an aiming function in positioning a tool so that it can accomplish the operation on the object, said apparatus including in combination micromanipulator means having the said microscope operatively connected thereto and movable thereby so that said microscope will provide a magnified view of an object in the work area, and a tool cooperating with said microscope and movable by said micromanipulator means with respect to the work area, said tool having a predetermined relationship with the target finder of the microscope so that said tool can be established in an aligned condition with an object in said work area by operating said micromanipulator means to bring the target finder of the microscope into alignment with the object.

20. Apparatus adapted for use in attaching minute elements to assemblies which in complete form are electronic devices, and for supplying the assemblies and the elements to a work area in the apparatus and preparing them for the attachment operation, said apparatus including in combination a sequential feeding mechanism adapted to move the assemblies in sequence to the work area in the apparatus, a microscope mounted in the apparatus and affording a magnified view of the work area, first micromanipulator means having a feeding device therewith and movable thereby, which said device is adapted to supply to the work area an element to be attached to an assembly at the work area, said first micromanipulator means being adapted to move said device and an element supplied thereby small distances with operating movements over larger distances, second micromanipulator means having an attachment tool therewith and movable by said second micromanipulator means in the work area, said second micromanipulator means being adapted to move said tool small distances with operating movements over larger distances to place said tool at a position in said work area from which it can accomplish the attachment of an element to an assembly.

References Cited in the file of this patent

UNITED STATES PATENTS

| | | |
|---|---|---|
| 227,252 | Hodges | May 4, 1880 |
| 963,234 | Marshall | July 5, 1910 |
| 2,390,596 | Larsen | Dec. 11, 1945 |
| 2,497,127 | Lecarme | Feb. 14, 1950 |
| 2,953,840 | Freeburg | Sept. 27, 1960 |